Figure 1:
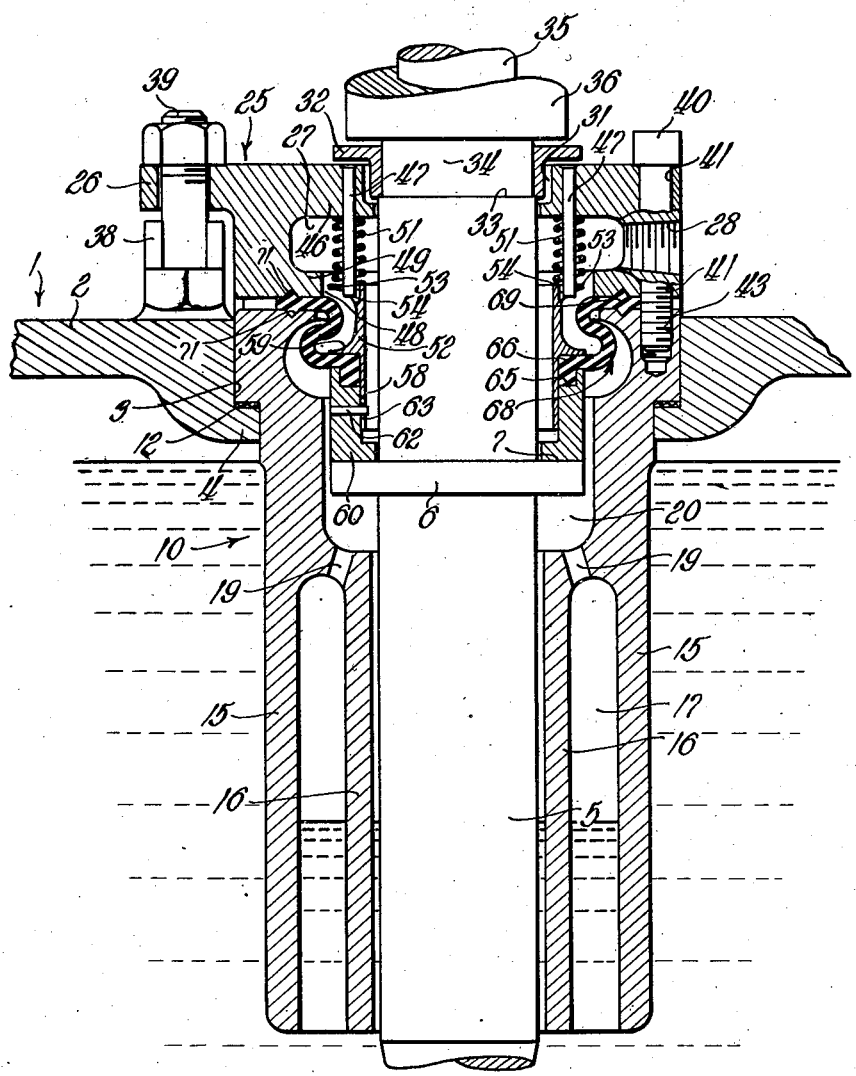

March 5, 1940.  H. E. LA BOUR  2,192,395
AIR CUSHIONED GLAND
Filed May 6, 1938  2 Sheets-Sheet 1

Inventor
Harry E. LaBour

March 5, 1940.   H. E. LA BOUR   2,192,395
AIR CUSHIONED GLAND
Filed May 6, 1938   2 Sheets-Sheet 2

Inventor
Harry E. LaBour
By [signature]
Att'ys

Patented Mar. 5, 1940

2,192,395

UNITED STATES PATENT OFFICE 2,192,395

AIR CUSHIONED GLAND

Harry E. La Bour, Elkhart, Ind.

Application May 6, 1938, Serial No. 206,424

7 Claims. (Cl. 286—11)

This invention relates to pumps and is particularly concerned with centrifugal pumps for handling corrosive liquids and the like.

In pumps, such as the centrifugal type, for handling corrosive liquids, it is highly desirable to keep the corrosive liquids entirely out of contact, so far as possible, with the packing gland which seals the shaft where it passes through the pump casing. If the corrosive liquid comes into contact with the packing gland, not only is the life of the gland materially shortened but, in addition, the liquid acts on the shaft itself, roughens the sealing surface and otherwise makes it practically impossible to maintain a tight leak-proof seal at this point.

The principal object of this invention is to provide a packing gland construction in which means is provided for effectively preventing the corrosive liquid from ever coming into direct contact with either the packing gland or the pump shaft engaging the packing gland. According to the principles of the present invention, I provide means for trapping a body of air about the packing gland and shaft and utilize that trapped body of air to prevent liquid from rising up the shaft into contact with either the latter or the packing gland itself. Preferably, the air is trapped and maintained by utilizing the principle by which air is maintained in diving bells for the purpose of preventing the water from rising too far in the bell. Similarly, according to my invention, the corrosive liquid in the pump is prevented from rising up into contact with the packing gland. Obviously, this invention is particularly adapted for use with pumps employing a vertical shaft.

A further object of this invention is the provision of a packing gland construction in which, not only is the liquid in the pump prevented from coming into contact with the packing gland, but in addition a lubricant chamber is provided to increase the effective tightness of the seal provided by the gland.

Still further, another object of this invention is the provision of a packing gland in which a relatively hard packing ring is pressed into sealing engagement with a shoulder on the shaft, the packing ring being connected to the stationary pump casing by a flexible tubular member which is formed of corrosion resistant material and is secured in leak-tight relation to a sleeve which serves to trap a body of air about the packing.

These and other objects and advantages of my invention will be apparent from the following detailed description of the preferred embodiment, taken in conjunction with the accompanying drawings.

Figure 2:
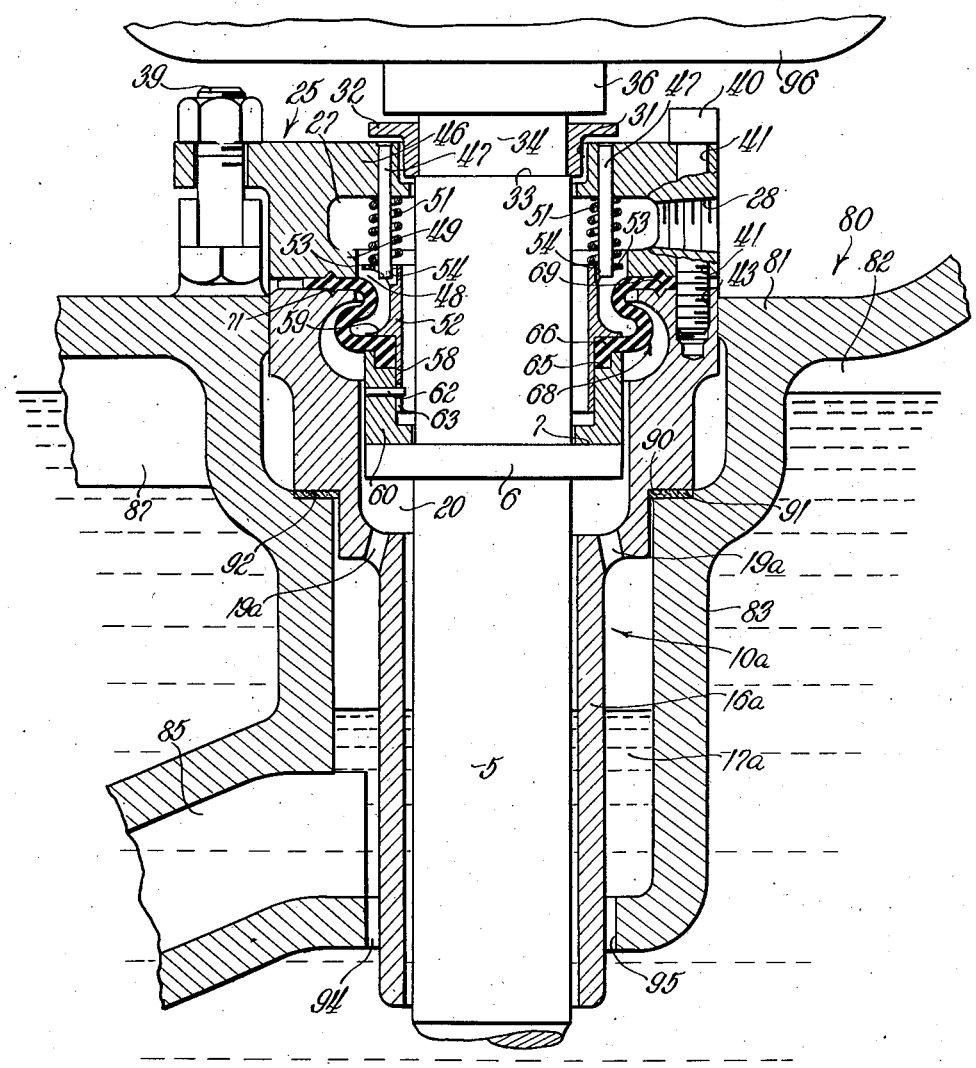

In the drawings:

Figure 1 is a central vertical section taken through an air seal packing gland embodying the principles of this invention; and Figure 2 is a view similar to Figure 1 showing a modified form of gland construction in which the casing of the pump has a section utilized as a part of the means providing an air seal.

Referring first to the form of the invention shown in Figure 1, the pump casing is indicated at 1 and has an upper wall 2 provided with an opening 3 with a radially inwardly disposed flange 4. The impeller shaft 5 of the pump extends vertically upwardly through the opening 3 and at a small distance below the wall 2 is provided with an integral shoulder or collar 6 having an upwardly facing sealing surface 7 formed thereon. While I have shown the shouldered section 6 as formed integral with the impeller shaft 5, it is to be understood that the part 6 may be in the form of a part separate from but fixed in a suitable manner to the shaft 5.

A sleeve 10 is disposed in the opening 3 and has an upper flanged section seated against the flange 4 of the pump casing 2. A gasket 12 prevents leakage at this point. The lower portion of the sleeve 10 is formed with two concentric cylindrical sections 15 and 16 spaced apart to provide an annular chamber 17 surrounding the shaft 5. The cylinders 15 and 16 are open at their lower ends but are joined together at their upper ends. The inner cylinder 16 surrounds the shaft 5 in close fitting relation but out of direct contact therewith. A plurality of ducts 19 extend from the upper portion of the space 17 into the space 20 above the cylinders 15 and 16, this latter space being of larger diameter than the shaft 5 so as to receive the shouldered section 6 of the shaft 5.

Clamped to the upper end of the sleeve 10, preferably outside the pump casing 2, is a casting 25 having a plurality of apertured ears 26 and an interior lubricant receiving chamber 27. Access to the latter is had through a tapped opening 28 through which oil or other lubricant is directed. The upper wall of the lubricant chamber 27 has an opening 31 through which the upper end of the shaft 5 extends, and a slinger ring 32 is carried by the shaft at this point up against a shoulder 33 formed on the shaft by the portion 34 thereof which is of slightly reduced diameter. Above the reduced portion 34 the shaft 5 carries a stem 35 which is inserted in and secured in any suitable manner to a tubular drive shaft 36. Where the pump is particularly adapted to handle corrosive liquids and the like, the impeller shaft 5 is made of corrosion resistant alloy or other material. The pump casing 2 is provided with a number of slotted ears 38 which receive the lower ends of bolts 39, the upper threaded ends of which are received in the apertured ears 26. The lubricant chamber casting 25 is secured to the upper or outer end of the sleeve 10 by means of a plurality of cap screws 40 extending downwardly through openings 41 formed in the chamber 27 and screwed into tapped openings 43 formed in the upper end of the sleeve 10.

The upper wall 46 of the lubricant chamber 27 is provided with two or more pins 47 pressed into suitable openings in the wall 46 and welded or otherwise fixed in place therein. The pins 47 extend downwardly through the chamber 27 into the enlarged opening 48 in the lower wall 49 of the chamber 27 and receive springs 51. Disposed about the shaft 5 with its upper end in the opening 48 is a vertically extending retainer sleeve 52 having an internal diameter slightly larger than the diameter of the shaft 5 so that there is no contact at this point. At its upper end the retainer sleeve 52 is flanged, as at 53, and has two or more enlarged holes 54 in which the lower ends of the pins 47 are loosely received. The springs 51 bear against the upper flange 53.

The sleeve 52 extends downwardly into the space 20 and has a second flange 59 spaced below the upper flange 53 and a lower skirt section 58. A sealing ring 60, preferably of incompressible non-fibrous material such as carbon or any other suitable material, is disposed about the skirt of the sleeve section 52 and is held against rotation with respect thereto in any suitable manner, such as by having one or more lugs or pins 62 carried by the ring 60 and extending into slots 63 formed in the section 58 of the sleeve 52. The upper edge of the ring 60 has a groove 65 formed therein to receive the lower end 66 of a diaphragm 68 in the form of a flexible sleeve or tubular member, preferably formed of rubber or rubber-like material which is resistant to corrosion by acids and the like and unaffected by oil or other lubricant. The upper end of the flexible diaphragm 68 has a radially outwardly extending flange 69 which seats between the casting 25 and the upper end of the sleeve 10 and is clamped in leak-tight relation therein by the screws 40. The cooperating faces of the casting 25 and the sleeve 10 have grooves 71 into which portions of the flange 69 are forced, thereby facilitating the attainment of a leak-tight connection at this point. The diameter of the flexible diaphragm 68 is slightly larger than the retainer sleeve section 52 about which it is disposed and has an external diameter slightly less than the internal diameter of the adjacent portions of the sleeve 10. Preferably, the walls of the sleeves 10 and 52 adjacent the rubber diaphragm are curved.

Each spring 51 bears at its upper end against the lower surface of the upper wall 46 of the lubricant reservoir 27 and at its lower end against the flange 53 on the sleeve 52, forcing the flange 59 against the end 66 of the diaphragm 68 and forcing the sealing ring 60 down into sealing engagement with the surface 7 of the flange 6 on the impeller shaft 5. If desired, the end 66 may be vulcanized or otherwise permanently bonded to the sealing ring 60, or it may be moulded, rabbetted, dovetailed, or otherwise attached to the ring 60 to secure relatively firm attachment. It will be noted that there is sufficient space between the sleeve 52 and the shaft 5 to permit the passage of lubricant from the reservoir 27 down into the plane of contact between the sealing ring 60 and the upper surface 7 on the shaft flange 6. The lubricant aids in maintaining a tight seal at this point in addition to lubricating the relatively movable surfaces on the collar 6 and the sealing ring 60.

In operation, when the pump is first started up, the casing is at least partially filled with air, but as the pump continues to operate liquid is drawn in and the level in the pump casing 2 rises from below the open ends of the cylinders 15 and 16 to a point above, the rising level of liquid in the pump casing trapping a body of air in the chamber 17 and the space 20. Thus, the sleeve 10 confines the body of air about the packing gland so that even though the liquid level in the pump should rise and even entirely fill the casing 2, the air in the chambers 17 and 20 prevents the liquid from coming into actual contact with the packing gland or with the portions of the shaft adjacent the packing gland.

If the liquid handled by the pump is corrosive, this is an especially important feature. The lubricated seal between the relatively stationary ring 60 and the rotating collar 6 on the shaft 5 prevents any material movement of air either into or out of the chamber 20. While the packing gland construction described above may be disposed either on the pressure side or on the suction side of the pump, it is preferably arranged on the suction side so that if the packing gland does pass a small quantity of air, that air will be drawn into the space 20 and thus replenish the air supply maintained about the packing gland. Also, small quantities of the lubricant may be drawn into the space 20, but this is not objectionable and aids in keeping the corrosive liquid out of contact with the packing gland.

If the air seal packing gland construction described above is used on the pressure side of a pump, the effectiveness of the lubricated seal between the collar 6 and ring 60 will prevent a quick loss of air from the spaces 17 and 20. Therefore, if the pump is intermittently operated so as to periodically replenish the air in the spaces 17 and 20, the packing gland and air trap may be used on the pressure side of the pump. However, for continuous operation it is preferable to arrange the packing gland and air seal on the suction side of the pump so that if there is any leakage through the gland, the air and oil leaking into the spaces 17 and 20 will replenish the air supply and prevent any of the corrosive liquid from rising into contact with the packing gland surfaces.

The loose connection between the sleeve 52 and the stationary pins 47 permits the sleeve 52 and sealing ring 60 to follow the shaft 5, even though the shaft may be rotating eccentrically or otherwise out of alignment, so that a tight seal is maintained at all times.

The central portion of the flexible diaphragm 68 inwardly of the flange 69 is subjected to the pressure or suction within the pump, but is confined against movement, either outwardly under pressure or inwardly under suction, by the curved walls at the adjacent portions of the sleeves 10 and 52, so that there is no likelihood of the diaphragm 68 being damaged or pulled out of sealing engagement with the ring 60 or the ring being pulled away from the collar 6.

The form of the invention shown in Figure 2 embodies practically all of the features described above in connection with Figure 1, but has been constructed so as to be adapted for use with a pump of the type in which the section of the pump casing through which the shaft extends is itself provided with a sleeve-like extension which can be utilized as the outer cylinder of the gland seal, which, to a certain extent, simplifies the construction of the sleeve carrying the packing gland members.

Referring now to Figure 2, the pump 80 shown in this figure includes a casing 81 having an intake chamber 82 of the type adapted to trap air therein and a depending sleeve-like section 83 which extends downwardly into the chamber 82. Under certain conditions a pump of this particular kind is not equipped with any packing gland but has parts disposed about but spaced from the impeller shaft so that there is no rubbing or sliding contact therebetween, the clearance being sealed by a movement of a sealing fluid that may be the liquid pumped or that may be an entirely separate liquid. In a pump of this kind, the lower end of the sleeve 83 has a passage 85 which receives the circulating sealing fluid, and usually the pump is also provided with an overflow passage 87 by which excess sealing fluid is discharged.

The present invention is admirably adapted to provide an air cushioned gland for a pump of this kind since the outer sleeve-like section 83 of the pump casing can be utilized for the outer cylinder of the sealing bell, serving substantially the same purpose as the outer cylinder 15 shown in Figure 1.

Referring now to Figure 2, it will be seen that parts shown in this figure which are identical with parts shown in Figure 1 and described above are identified by the same reference numerals. In Figure 2 a sleeve 10a, corresponding to the sleeve 10 in Figure 1, is provided adjacent its upper end with a downwardly facing shoulder 90 which seats against a gasket 91 carried by a shoulder 92 formed in the upper portion of the section 83. The sleeve 10a has openings 19a that provide for communication between the chamber 17a and the space 20, as in Figure 1, and the inner sleeve 16a extends downwardly about the shaft 5 in closely spaced relation, like the sleeve 16 of Figure 1. Preferably, however, the sleeve 16a extends below the section 83 of the pump casing 81, but there is a clearance 94 between the lower end of the sleeve 16a and an opening 95 in the lower portion of the sleeve-like section 83 through which the lower end of sleeve 16a extends. In Figure 2, the shaft 5 is driven by a motor 96.

The operation of the packing gland construction shown in Figure 2 is substantially the same as the form shown in Figure 1. When the pump 80 is started, a body of air is disposed in the air trap 82, but when liquid is drawn up into the pump, the level of liquid rises in the chamber 82 and traps a body of air in the chamber 17a between the inner cylinder 16a and the outer cylinder 83 of the pump casing. This air thus trapped is maintained within the space 20 and effectively prevents liquid within the pump from rising along the shaft 5 into contact with the gland rings and associated parts of the impeller shaft. As mentioned above in connection with Figure 1, the lubricated seal between the ring 60 and the collar 6 on the shaft 5 prevents any rapid movement of air either into or out of the space 20. Thus, the seal can be used either on the pressure side or on the suction side of the pump. However, as illustrated, the seal of Figure 2 being disposed about the shaft 5 where it passes out of the intake chamber or air trap 82, is subjected to suction. Therefore, any air which might pass between the ring 60 and the collar 6 serves the useful purpose of replenishing the air within the space 20 so that adequate air to protect the gland at all times is assured. The sleeve 16a is disposed closely adjacent to the shaft 5 so that the rapid rotation of the shaft 5 will not wash out air from the space 20, as in Figure 1.

While I have shown and described above the preferred means in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. In a pump comprising a casing and an impeller shaft extending vertically through the casing, a packing gland for the upper end of the shaft where it passes through said casing, a sleeve disposed about said shaft and secured at its upper end to said casing about said packing gland, the upper end of said sleeve forming an air chamber on the inner side of said gland, the lower portion of said sleeve including a pair of spaced concentric cylinders open at their lower ends and communicating at their upper ends with said air chamber, said cylinders serving to trap a body of air in said air chamber, when the liquid level in said pump rises above the lower ends of the cylinders, to prevent liquid from rising in the sleeve far enough to come into contact with said packing gland, the inner cylinder closely embracing said shaft to prevent the rotation of the shaft from agitating the liquid in the air trap and washing out the air therefrom.

2. In a pump having a casing with an opening therein and an integral depending tubular section surrounding said opening and provided with an upwardly facing shoulder and an impeller shaft extending vertically through said opening and tubular section, a sleeve disposed about said shaft and secured at its upper end against said shoulder in leak-tight relation, and a packing gland for the upper end of the shaft where it passes through said sleeve, the latter closely embracing said shaft below said packing gland and said tubular section being spaced outwardly of said sleeve and there being an opening leading from the space between said section and sleeve to the space surrounding said gland, whereby when the liquid level in said pump rises above the lower ends of said sleeve and tubular section a body of air is trapped about said gland to prevent liquid from rising within said sleeve and section far enough to come into contact with said gland.

3. In a pump including a casing having an opening and an impeller shaft extending vertically through said opening, a sleeve fixed in said opening and extending downwardly about said shaft, said sleeve being open at its lower end, a shoulder formed on said shaft adjacent the upper end of said sleeve, a packing ring seating against said shoulder in substantially leak-tight relation, a flexible tubular member disposed about said shaft and at its lower end engaging said packing ring, a lubricant chamber clamped to the upper end of said sleeve and serving to seal the other end of said flexible tubular member, a plurality of pins carried by the lubricant chamber, a retainer sleeve anchored loosely to said pins so as to be held against rotation but capable of limited universal movement relative to the casing, a plurality of springs disposed about said pins and reacting against said lubricant chamber for pressing the lower end of said retainer sleeve against said flexible member and the lower end of the latter against said packing ring to force the packing ring against the shoulder on said shaft, said lubricant chamber being in communication with the interior of said retainer sleeve and lubricant in said chamber serving to seal the packing ring against said shoulder, said fixed sleeve being adapted to trap air to prevent liquid in the pump from rising into contact with said packing ring and the adjacent portions of said shaft, and means reacting against the casing for clamping the lubricant chamber and said sleeve in position.

4. A packing gland for a casing or the like through which a shaft extends generally vertically, comprising a pair of concentric sleeves extending downwardly about the shaft and each having a lower end, the outer sleeve being connected to the casing in leak-tight relation, means sealing the casing to said shaft, and means providing for communication adjacent the upper ends of the sleeve between the space between said sleeves and the space surrounding said shaft adjacent said sealing means, rising liquid level in said casing serving to trap air within said latter space and said inner sleeve serving to prevent rotation of said shaft from washing out the trapped air.

5. In combination with a wall having an aperture, a shaft extending through the aperture, said shaft having an annular sealing shoulder, a cooperating wear ring surrounding the shaft and adapted to make a tight joint with said annular shoulder, a tubular corrugated rubberlike diaphragm having one end in sealing engagement with the wear ring, means for sealing the outer end of the diaphragm to the walls of said aperture, a sleeve surrounding the shaft and lying inside the corrugated diaphragm, one end of the sleeve being removably keyed to the sealing ring, means for keying the other end of said sleeve loosely but non-rotatably to the wall of the aperture, and spring means for pressing the sealing ring against the shoulder, said spring means exerting its pressure through said sleeve.

6. The combination of claim 5 with means on the sleeve and the wall and extending within the folds of the corrugated diaphragm to limit the deflection of the same by variations of fluid pressure upon opposite sides of the diaphragm.

7. The combination of claim 5 in which the sleeve is provided with a shoulder which holds the diaphragm in sealing engagement with the sealing ring.

HARRY E. LA BOUR.